Figure 1:
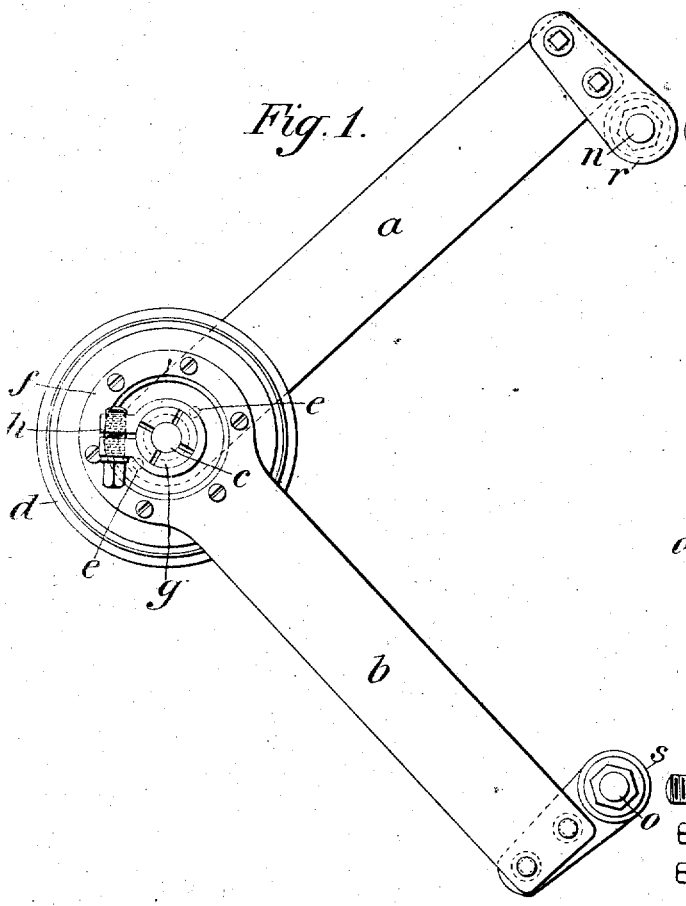

No. 12,399.

REISSUED NOV. 7, 1905.

J. M. M. TRUFFAULT.

ANTIVIBRATION DEVICE FOR VEHICLES.

APPLICATION FILED JAN. 10, 1905.

2 SHEETS—SHEET 1.

Witnesses:
Chas. D. King.
Adolph F. Dinz.

Inventor
Jules M. M. Truffault
by Dunn & Fink
Attys.

No. 12,399. REISSUED NOV. 7, 1905.

J. M. M. TRUFFAULT.

ANTIVIBRATION DEVICE FOR VEHICLES.

APPLICATION FILED JAN. 10, 1905.

2 SHEETS—SHEET 2.

Witnesses:
Chas. D. King.
Adolph G. Dinz.

Inventor
Jules M. M. Truffault.
by Dunn & Fish
Attys

UNITED STATES PATENT OFFICE.

JULES MICHEL MARIE TRUFFAULT, OF PARIS, FRANCE, ASSIGNOR OF FIFTY-ONE ONE-HUNDREDTHS TO EDWARD V. HARTFORD AND FORTY-NINE ONE-HUNDREDTHS TO GEORGE H. HARTFORD, OF ORANGE, NEW JERSEY.

ANTIVIBRATION DEVICE FOR VEHICLES.

No. 12,399. Specification of Reissued Letters Patent. Reissued Nov. 7, 1905.

Original No. 743,995, dated November 10, 1903. Application for reissue filed January 10, 1905. Serial No. 240,511.

*To all whom it may concern:*

Be it known that I, JULES MICHEL MARIE TRUFFAULT, engineer, of 51 Avenue des Ternes, in the city of Paris, Republic of France, have invented Improvements in or Relating to Antivibration Devices for Vehicles, of which the following is a full, clear, and exact specification.

In order to diminish the transmission to the body or suspended portion of a vehicle of the shocks and vibrations partaken in by the running-gear by reason of the unevenness of the ground, obstacles encountered, &c., various types of elastic suspension means have been interposed between the carriage-frame and the running-gear, different kinds and sizes of springs being usually employed for this purpose. These springs, however, by reason of their very elasticity and freedom of movement, upon compression cause a recoil shock or vibration which is communicated to the body portion and which is almost as disagreeable and objectionable as the original shock would be, and this is particularly so when the vehicle is traveling at a high speed and the shocks are more rapidly received. This constant oscillation is not only disagreeable to the passengers, but results in excessive wear and tear and causes a rapid deterioration of the vehicle itself. To overcome these drawbacks is the object of the present invention; and it consists in combining with or applying to the ordinary means of suspension a device whereby the action of the springs or suspension devices is retarded, thus preventing the excessive recoil vibration and the transmission of shocks to the carriage-frame. Such an arrangement can be carried out in various ways, according to the construction of the vehicle to which it is applied, and in the embodiments shown in the drawings forming a part of this application comprises one or more frictional folding parts or joints, one arm being attached to the frame and the other being secured upon the axle of the carriage. With this arrangement when the running-gear meets an obstruction which tends to lift it the vertical movement is not communicated to the carriage-frame, but is taken by the suspending-springs, the frictional folding joint partaking in the movement, but materially retarding it. The recoil of the springs is also reduced and retarded by the action of the friction device and to a considerably greater extent than the original movement, for the reason that the recoil exerts considerably less mechanical effort than the fundamental compression, while the tension of the friction device is a constant quantity. In the preferred form of my invention it will furthermore be found that the relative movement of the friction-surfaces is considerably less than the relative movement of the running-gear and body of the vehicle by reason of the use of the connecting levers or arms, and this is of importance in that it enables a sufficient tension to be applied to the device without interfering with its constant and invariable movement.

From the foregoing description it will be seen that this invention has for its object to continuously retard or break the suddenness of the action of the spring-supporting means, and thus to prevent, as far as possible, the vibration of the running-gear from being communicated to the body portion.

Several forms of my invention are illustrated in the accompanying drawings, in which—

Figure 2:
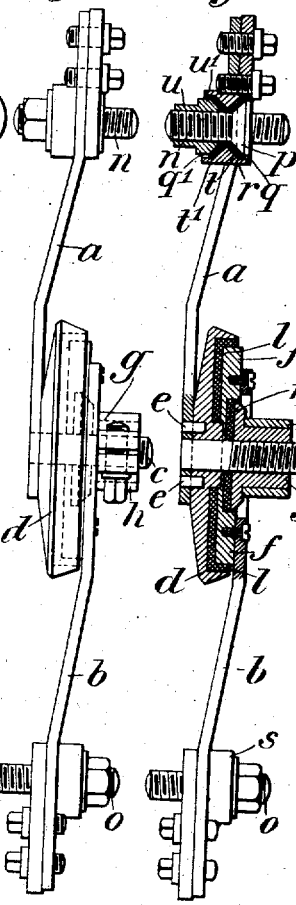
Figure 3:
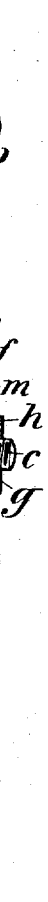

Figure 1 is an elevation. Fig. 2 is a side view. Fig. 3 is a section. Figs. 4 to 8 show several applications of the device.

In the figures the same letters of reference denote the same parts.

As shown in Figs. 1 to 3, the frictional hinge device comprises arms *a b* with their end portions frictionally clamped together and mounted upon a bolt or stud *c*. One arm *a* carries a socket or flanged disk *d*, with which it is rigidly connected by rivets *e*. The other arm *b* carries a corresponding disk or plate *f*, fitting in the socket *d* and clamped thereto by a nut *g*, screwed on the threaded end of the stud *c*. This nut is split, as shown in Fig. 1, and is held completely immovable upon the stud *c* by a screw-collar *h*. A leather washer is interposed between the socket *d* and the disk *f*, and a screw-washer *m* is fitted between the latter and the nut *g*. By tightening or loosening the nut *g* the frictional contact between the socket and disk, and consequently between the two hinged arms, can be raised at will. The arms *a b* carry at their other ends pivots *n o*, respectively, and mounted so as to produce a frictional action. Each of these pivots is constituted by a threaded rod having a conical part or nut *p* adapted to fit in a socket $q$, which for this purpose comprises the parts $r$ $s$, secured to the ends of the arms $a$ and $b$. A leather ring $t$ is interposed between the conical part or nut $p$ and the socket $q$. The cone $p$ is tightened against the leather insertion $t$ by a nut $u$, arranged upon the threaded portion $n$ $o$ of the rod and having a conical front portion $u'$, which fits in the correspondingly-recessed portion of the socket $q'$ on the side of the parts $r$ $s$ opposite to that on which the cone bears. A ring $t'$, of leather, is fitted between the recess $q'$ and the conical part $u'$ of the nut. Thus each of the rods or axles $n$ $o$ has two conical parts $p$ and $u'$, which work with frictional action against the leather packings $t$ and $t'$, thereby producing a resistance adapted to take up or deaden the vibrations and oscillations of the carriage. One of the threaded rods $n$ is attached to the axle and the other rod $o$ to the frame of the carriage. This friction device can in a convenient manner be conbined with the ordinary elastic suspension devices.

Figure 4:
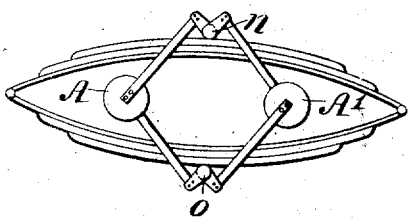
Figure 5:
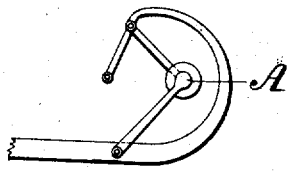

Fig. 4 shows a way of applying this invention, in which the friction device consists of two sets of disks A A', constructed as above described, the ends of their arms being capable of turning with a frictional action of the pivots $n$ $o$, one of which is fixed to the lower and the other to the upper part of an ordinary elliptical spring. The apparatus could also be applied to a C-spring, as shown, Fig. 5, or to other convenient forms of spring, Fig. 6. In this latter case the end of one of the arms of the device A can be mounted with a frictional action upon a support B on the frame of the carriage, while the end of the other arm $b$ is attached to one end of a straight spring carried by the carriage-axle, the other end of this spring being mounted with a frictional action upon a support B', also secured to or depending from the frame of the carriage.

Figure 7:
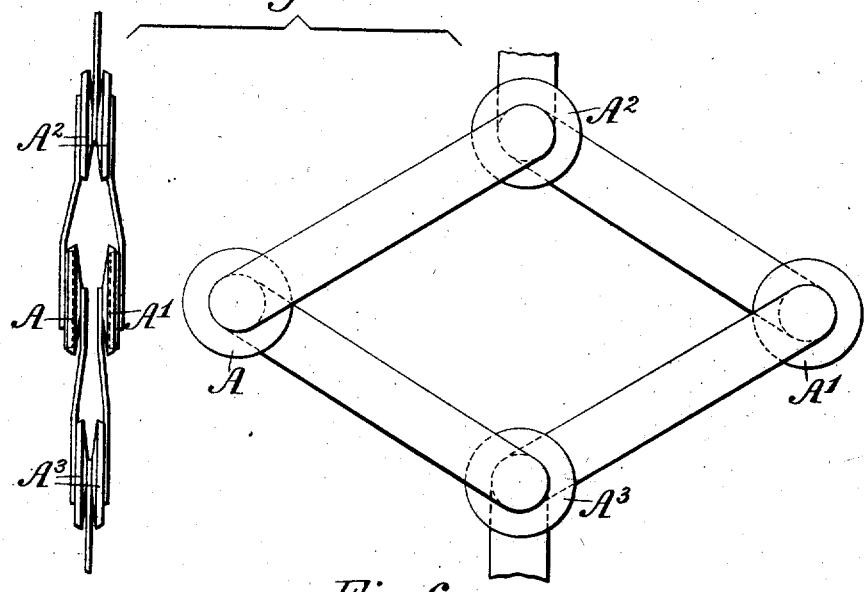
Figure 6:
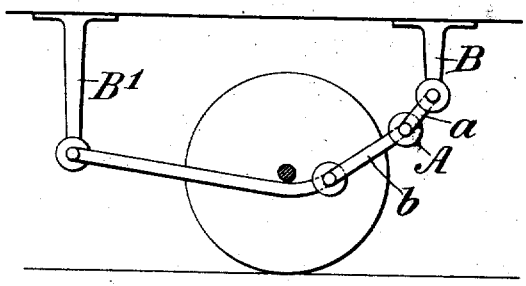

The antivibration device according to the present invention could also be arranged in the form of a parallelogram, Fig. 7. In this form it comprises four frictional disk devices, of which the two side ones, A A', are single, while the top and bottom disks $A^2$ $A^3$, carried by the axle and by the frame of the carriage, respectively, are double.

Figure 8:
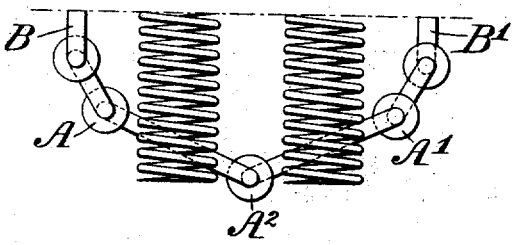

The apparatus could, moreover, be combined with two buffer-springs, as shown in Fig. 8, the suspension being effected either by the arms of one, two, or more springs, as desired. In this case the apparatus consists of two single devices A A', the lower arms of which coöperate with a double frictional disk device $A^2$, fixed to or integral with the axle, while the upper arms are mounted with a frictional action on supports B B' on the frame of the carriage. It can be easily understood that these frictional devices allow of an easy displacement of the carriage-frame with regard to the axles, so as to deaden the shocks due to uneven roads, &c., while the different frictional surfaces of the antivibration devices offer a sufficient resistance in order to prevent vibration or oscillation of the springs, and consequently of the frame, of the carriage. Moreover, the springs, which yield after each shock, effect the return of the frictional devices to their initial positions.

It is obvious that the apparatus according to this invention can be combined with all kinds of springs and that the form, dimensions, and arrangement of the parts can be modified according to necessity.

I claim—

1. An antivibration device comprising a friction-disk having a peripheral flange and a flat interior surface, an arm rigidly attached to said disk and means on said arm for securing it to the frame of a vehicle, a second friction-disk concentric with said first disk, an arm rigidly attached to said last-mentioned disk and means on said arm for securing it to the rnnning-gear of a vehicle, a washer seated within the recess formed by said flange and between the faces of said disks, a bolt rigidly attached to one of said disks and passing freely through an aperture in the other disk and means on said bolt for adjusting the disks relatively to each other, substantially as described.

2. An antivibration device comprising a friction-disk having a peripheral flange and a flat interior surface, an arm rigidly attached to said disk and means on said arm for pivotally securing it to the frame of a vehicle, a second friction-disk seated within said flange, an arm rigidly attached to said last-mentioned disk and means on said arm for pivotally securing it to the running-gear of a vehicle, a washer seated within the recess formed by said flange and between the faces of said disks, a bolt rigidly attached to one of said disks and passing freely through an aperture in the other disk, a nut on said bolt to regulate the friction and means to lock the said nut in position substantially as described.

3. An antivibration device comprising a pair of friction-disks having parallel friction-faces, an arm rigidly connected at one end to each of said disks, means upon the opposite end of one arm whereby the same may be pivotally secured to the frame of a vehicle and means upon the opposite end of the other arm whereby the same may be pivotally secured to the running-gear of a vehicle, the friction-faces of said disks being in a vertical plane parallel to a line drawn between the pivotal supporting means of said two arms, a washer between said friction-faces, and means for adjusting said friction-faces toward and from each other substantially as described.

4. An antivibration device comprising a pair of friction-disks having parallel friction-faces, a peripheral flange upon one of said disks, which receives and partially incloses the other disk, an arm rigidly connected at one end to each of said disks, means upon the opposite end of one arm whereby the same may be pivotally secured to the frame of a vehicle and means upon the opposite end of the other arm whereby the same may be pivotally secured to the running-gear of a vehicle, the friction-faces of said disks being in a vertical plane parallel to a line drawn between the pivotal supporting means of said two arms, a washer between said friction-faces, and means for adjusting said friction-faces toward and from each other, consisting of a bolt affixed to one disk and passing through an aperture in the other disk, a nut on said bolt and a lock for said nut substantially as described.

5. An improved antivibration device for vehicles of all kinds, as hereinbefore described, in which every folding joint comprises two arms hinged together, one carrying a socket or flanged disk and the other a plate in frictional contact with the leather inserted within the socket and with a leather washer pressed against the plate by means of a nut screwed on a stud, substantially as described.

6. An improved antivibration device for vehicles of all kinds, as hereinbefore described, in which the arms of every folding joint are frictionally mounted on the one hand upon a stud secured upon the axle and on the other hand upon a stud secured upon the frame, each of these studs presenting two conical parts abutting against conical leather-lined surfaces presented by pivots mounted at the end of each of the arms of the folding joint, substantially as described.

JULES MICHEL MARIE TRUFFAULT.

Witnesses:
JOHN BAKER,
MAURICE H. PIGNET.